Jan. 5, 1937.  N. P. BILLING  2,066,605
CAMERA
Filed Oct. 23, 1934   2 Sheets-Sheet 1

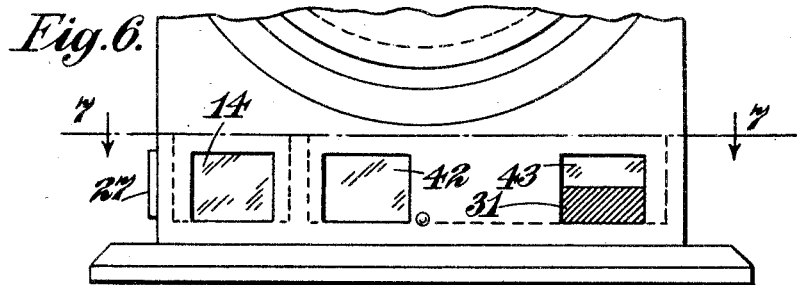
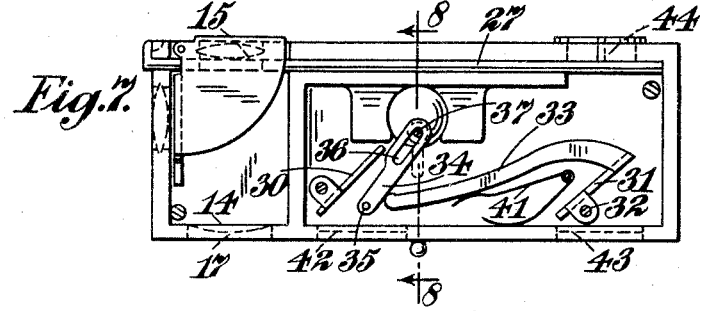
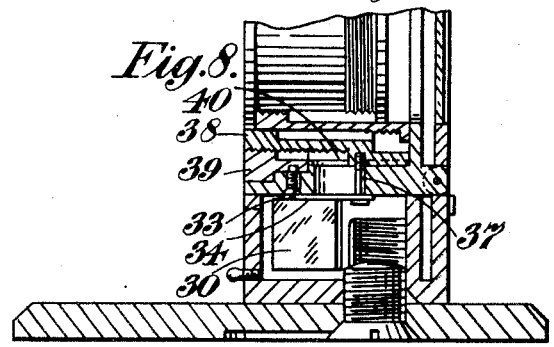
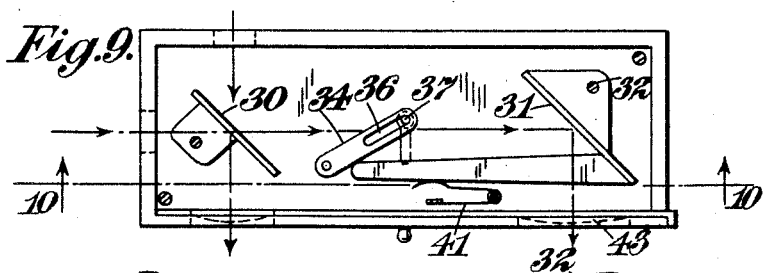
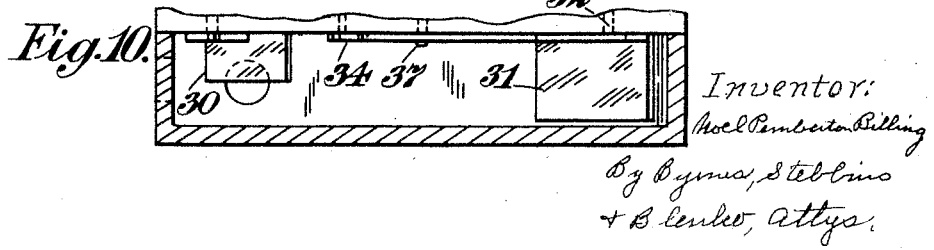

Patented Jan. 5, 1937

2,066,605

UNITED STATES PATENT OFFICE 2,066,605

CAMERA

Noel Pemberton Billing, London, England

Application October 23, 1934, Serial No. 749,654
In Great Britain November 3, 1933

12 Claims. (Cl. 95—44)

This invention consists in improvements in or relating to cameras and has for its object to provide, in a camera, novel means whereby the time of exposure can be accurately ascertained for any conditions of light under which the taking of a picture is contemplated.

According to the present invention a camera comprises as an element in its structure an exposure meter incorporated in a lens system of the camera.

Preferably the lens system in which the exposure meter is incorporated constitutes a view finder which in one form of the invention is of a periscopic type.

The view finder conveniently comprises an eye-glass, an object-glass, one or more prisms or reflectors situated in the path of the light rays passing from the object-glass to the eye-glass, and the exposure meter comprises an adjustable element constituting the equivalent of a light density wedge situated so as to intercept the light rays passing through the view finder.

In order that the invention may be more clearly understood a preferred example will now be described with the aid of the accompanying drawings, in which—

Figure 1:
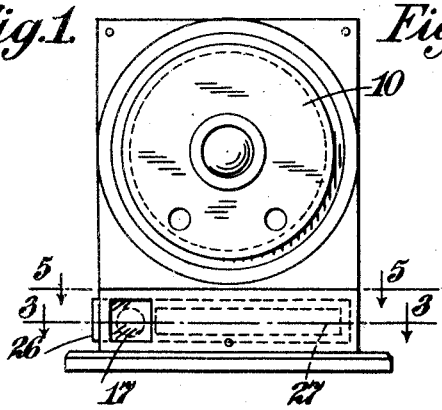
Figure 1 is a front view of a camera embodying the present invention.
Figure 2:
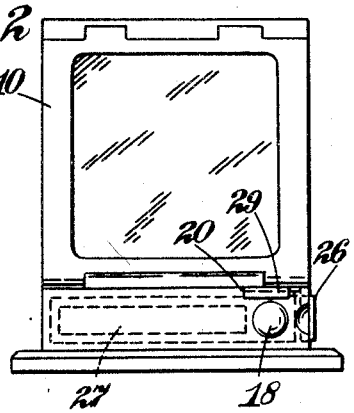
Figure 2 is a rear view thereof.

Figure 6 is a view similar to Figure 1 of the lower portion of the camera illustrating a modified construction, Figure 7 is a section on the line 7—7 of Figure 6, Figure 8 is a section on the line 8—8 of Figure 7, Figure 9 is a view similar to Figure 7 of a still further modification, and Figure 10 is a section on the line 10—10 of Figure 9.

Like reference numerals indicate like parts in the several figures of the drawings.

The camera body which is designated as a whole by the reference numeral 10 may be of any preferred form. In the lower portion of the case there is a socket 11 which is screwthreaded to receive a fixing screw 12 by which the camera body may be secured when desired on a stand or other fixing.

In the lower portion of the body there is provided a recess 13 having in it apertures 14 and 15 in the front and rear walls respectively and an aperture 16 in the outer lateral wall of the recess.

A front lens 17 is fitted and secured in the aperture 14, and rear lenses 18 and 19 are fitted and secured in the apertures 15 and 16 respectively.

Above the lens 18 there is formed through the rear wall of the recess 13, a slot 20 in which is pivoted at 21 an arcuate plate 22. To one edge of this plate is secured a reflector 23 extending substantially from top to bottom of the recess 13 in a plane perpendicular to the top and bottom walls of the recess. It will be seen particularly from a consideration of Figures 3, 4 and 5 that the reflector can be swung from the position of Figure 4 where it overlies the lens 19 to the position shown in Figure 3 where it lies at an angle of 45° to the axis of lens 17.

Between the rear wall 24 of the camera body and a partition 25 that is contiguous with the socket 11 there is a channel leading to an opening entering the recess 13 and to another opening leading out from that recess through the side wall of the camera body. This channel affords a guideway in which slides a carrier 26 and a strip 27 is mounted in the carrier. In the carrier is an open aperture 28 which, when the carrier is pushed fully home as in Figure 3, lies in front of the lens 18. The strip 27 constitutes a light density wedge, the light transmitting properties of which become gradually reduced in a direction away from the aperture 28.

Figure 3:
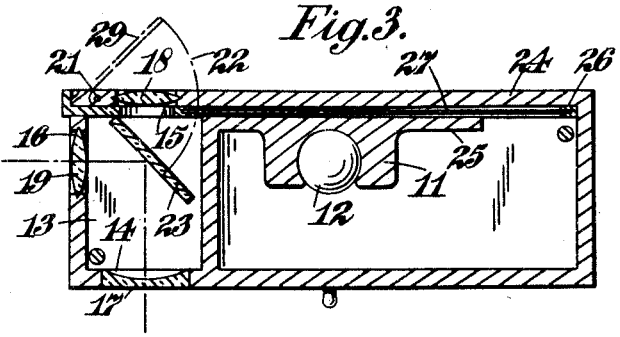
Figure 3 is a section, on an enlarged scale, on the line 3—3 of Figure 1 showing the exposure meter in its normally inoperative position.
Figure 4:
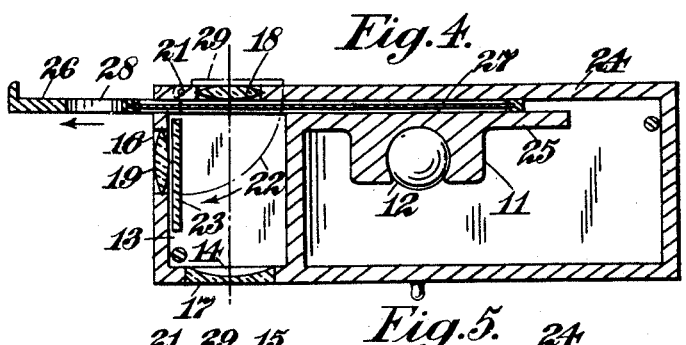
Figure 4 is a view similar to Figure 3 illustrating the exposure meter in use.
Figure 5:
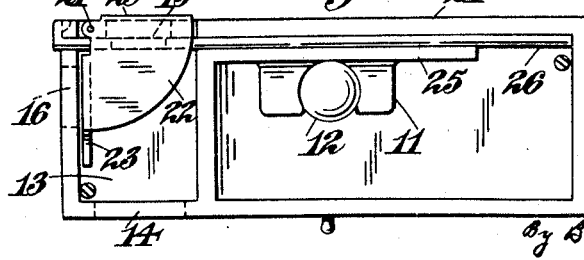
Figure 5 is a section on the line 5—5 of Figure 1.

In the use of the devices described above it will be observed that when the reflector 23 is in the position illustrated in Figure 4 the lenses 17 and 18 constitute a view finder using the lens 18 as the eye-glass. When the carrier 26 is pushed fully home as shown in Figure 3 the light rays pass through the lens combination 17 and 18 and through the aperture 15 without obstruction. In order to ascertain the correct exposure for the conditions under which any object is to be photographed, the object is viewed through the lens combination 17 and 18 and the carrier 26 is moved gradually outwardly in the manner illustrated in Figure 4, the strip 27 being utilized in the known manner as a density wedge of an exposure meter.

Should it be more convenient to do so the object to be photographed can be viewed in the view finder from the side of the camera body by swinging the reflector 23 to the position illustrated in Figure 3. This can be effected by manipulation of the plate 22 which has an overhanging edge 29 available to the operator from the outside of the camera.

When the reflector has been moved to the position just stated it serves to transmit and deflect light rays entering the lens 17 to the lens 19 which now serves as the eye-glass of the view finder. In this position of the reflector the exposure meter cannot be employed but it is obvious that it can first be employed using the lens combination 17, 18 to ascertain the required exposure before the reflector is swung to the position of Figure 3.

The strip 27 may be marked at intervals along its length in a manner to connote its position of adjustment with the exposure necessary. Alternatively, markings may be provided on the carrier 26 to be read against the edge of the slot in the side wall of the camera through which the carrier slides; or the carrier or a part moving with it may have on it indications to be exposed through an aperture provided for that purpose in the camera body.

It will be observed that by the present invention an efficient view finding means is afforded by which either direct or periscopic examination of the object to be photographed can be made; and in addition an exposure meter is combined with such a view finder in a convenient position and one in which the requisite exposure can be ascertained by direct sighting on to the object to be photographed.

The modified construction illustrated in Figures 6 to 8 shows a range finder combined with the exposure meter. In the compartment alongside the view finder compartment in the bottom of the camera body there is now arranged a fixed mirror 30 and a second mirror 31 pivotally mounted to swing about an axis 32 at right angles to the base of the camera. An arm 33 fixed to the mirror 31 has its free end engaged by a swinging link 34 pivoted at 35 to swing in a plane parallel with the bottom of the camera. The link is provided with a slot 36 which is engaged by a pin 37 extending downwardly from a sleeve 38. The latter is in screwthreaded engagement with a focussing ring 39 which can be rotated for the purpose of focussing the lens in any known manner. The sleeve 38 is held against rotation by a key 40 engaging in a keyway formed in the sleeve. This key serves also the purpose of guiding the sleeve and consequently the pin to move in a straight line parallel with the axis of the lens. It will thus be seen that by moving the sleeve inwardly or outwardly the link 34 will be turned and in its turn will press against arm 33 to turn the mirror 31 about its pivot 32, a hairpin spring 41 being employed to keep the arm 33 always in contact with the link 34. Apertures 42 and 43 serve to expose mirrors 30 and 31 respectively and lenses may, if desired, be included in each of those apertures. A viewing aperture 44 is also provided in the rear wall of the camera and fitted with a lens coaxially with the aperture 43. The mirror 30 extends at least to the full height of the aperture 42 but the mirror 31 is only half that height so that an object viewed through the aperture 44 will be seen, as to half of it, above the edge of mirror 31 (or below the edge thereof according to the position of the mirror) and as to its other half by reflection from the mirror 30 on to the surface of mirror 31.

By adjusting the two mirrors relatively to one another the two halves of the object viewed through the aperture 44 can be brought into register as in the use of range finders of this type. As the mirror 31 is adjusted by the focussing mechanism it will be obvious that provided the range finder is properly incorporated with the focussing device when the two halves of the object are brought into register the camera will be accurately focussed. At the same time the density wedge or strip 27 can be utilized in conjunction with the aperture 44 provided that the strip is arranged to move outwardly from the opposite side of the camera. It will be, however, more convenient to utilize the exposure meter strip, in this construction, with the aid of the view finder as before.

In the modified construction illustrated in Figures 9 and 10 the general principle of the apparatus is similar to that of the construction according to Figures 6 to 8. In the modified form, however, the fixed mirror 30 is now a component of the view finder and extends downwardly to obscure half of the aperture 15 whereas the mirror 31 is now full height. The mirrors 30 and 31 are oppositely inclined relatively to the similar mirrors of the previous construction, and the mirror 30 will have mirrored surfaces on both sides. The view finder can be utilized from either viewing aperture as previously described but in this case a view of half the object will enter through the lens 17 and the other half will be reflected from mirror 31. The exposure meter strip 27 will in this last described construction be as arranged in the first construction.

I claim:—

1. A photographic camera having a combined direct vision and reflex view-finder formed as an element in the structure of the camera, and having an exposure meter incorporated in the lens system of the view-finder.

2. A photographic camera having in combination a view-finder which is formed as an element in the structure of the camera and comprises object and eye lenses and a reflector adjustable into and out from a position in which it causes light passing through the object lens to be reflected to the eye lens whereby the view-finder can serve at choice of the user as a direct vision or as a reflex view-finder, and an exposure meter incorporated in the lens system of the view-finder.

3. A photographic camera having a combined direct vision and reflex view-finder formed as an element in the structure of the camera, and having an exposure meter comprising an adjustable element which constitutes a light density wedge and is situated to intercept light rays passing through the view-finder.

4. A photographic camera according to claim 1, in which the finder comprises a recess in the camera body and has a front lens in an aperture in the front wall thereof, a rear lens in the rear wall, a second rear lens in a transverse wall and a reflector adjustable into and out from a position between the front and rear lenses with a light density wedge constituting the exposure meter and formed as a strip slidable past one of the rear lenses.

5. A photographic camera according to claim 2 in which the adjustable reflector is operatively connected to means for moving it into and out from its operative position, said means extending to the outside of the camera body.

6. A photographic camera according to claim 1 in which the view-finder is situated at or near one corner of the camera body and the exposure meter is constituted by a light density wedge of strip form, in combination with guides provided in the camera body, and leading to a slot in a wall thereof, said guides serving to guide the strip which can thus move through the slot.

7. A photographic camera having a combined direct vision and reflex view-finder formed as an element in the structure of the camera and an exposure meter incorporated in the lens system of the view-finder, and having an optical range-finder incorporated also as an element in the structure of the camera.

8. A photographic camera according to claim 7 in which the range finder is one comprising twin mirrors in combination with a device for effecting relative adjustment of the mirrors, a movable element for focussing the camera and a mechanical coupling between the said device for effecting mirror adjustment and the said focussing element.

9. A photographic camera according to claim 7 in which the range-finder comprises one fixed mirror and a second mirror which is movable in combination with a focussing member for the camera movable into and out from the camera body and linkage connecting said focussing member with the second mirror to move and adjust the latter.

10. A photographic camera according to claim 7 in which the movable mirror serves also as the adjustable reflector of the view-finder.

11. A photographic camera according to claim 1 in which the finder comprises a recess in the camera body and has a front lens in an aperture in the front wall thereof, a rear lens in the rear wall, a second rear lens in a transverse wall and a reflector adjustable into and out from a position between the front and rear lenses with a light density wedge constituting the exposure meter and formed as a strip slidable past one of the rear lenses and in which the adjustable reflector is operatively connected to means for moving it into and out of its operative position, said means extending to the outside of the camera body.

12. A photographic camera according to claim 1 in which the finder comprises a recess in the camera body and has a front lens in an aperture in the front wall thereof, a rear lens in the rear wall, a second rear lens in a transverse wall and a reflector adjustable into and out from a position between the front and rear lenses with a light density wedge constituting the exposure meter and formed as a strip slidable past one of the rear lenses and in which the view-finder is situated at or near one corner of the camera body and the exposure meter is constituted by a light density wedge of strip form, in combination with guides provided in the camera body, and leading to a slot in a wall, said guides serving to guide the strip which can thus move through the slot.

NOEL PEMBERTON BILLING.